(12) United States Patent
Toya

(10) Patent No.: US 7,095,980 B2
(45) Date of Patent: Aug. 22, 2006

(54) LAND MOBILE SATELLITE-COMMUNICATION SYSTEM

(75) Inventor: Ken-Ichi Toya, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 521 days.

(21) Appl. No.: 09/836,829

(22) Filed: Apr. 17, 2001

(65) Prior Publication Data

US 2002/0022452 A1    Feb. 21, 2002

(30) Foreign Application Priority Data

Aug. 10, 2000    (JP)    ............................. 2000-242097

(51) Int. Cl.
*H04B 7/185* (2006.01)
(52) U.S. Cl. .................. 455/13.1; 455/428; 455/456.1
(58) Field of Classification Search ............... 455/13.1, 455/456, 12.1, 11.1, 428, 13.3, 427, 7, 511, 455/403; 343/6.8; 325/4
See application file for complete search history.

(56) References Cited

U.S. PATENT DOCUMENTS

| | | | | |
|---|---|---|---|---|
| 4,056,779 A * | 11/1977 | Toler | .......................... | 455/11.1 |
| 5,355,511 A * | 10/1994 | Hatano et al. | ............. | 455/11.1 |
| 5,490,284 A * | 2/1996 | Itoh et al. | ..................... | 455/428 |
| 5,812,558 A * | 9/1998 | Rotz et al. | ................... | 714/712 |
| 5,842,132 A * | 11/1998 | Fukutomi | ................. | 455/456.1 |
| 5,915,208 A * | 6/1999 | Collyer | ....................... | 455/11.1 |
| 5,937,332 A * | 8/1999 | Karabinis | ................... | 455/12.1 |
| 6,067,452 A * | 5/2000 | Alexander | .................. | 455/428 |
| 6,141,533 A * | 10/2000 | Wilson et al. | ............. | 455/11.1 |
| 6,313,786 B1 * | 11/2001 | Sheynblat et al. | ..... | 342/357.02 |
| 6,510,317 B1 * | 1/2003 | Marko et al. | ................ | 455/428 |
| 6,647,270 B1 * | 11/2003 | Himmelstein | ............ | 455/456.1 |
| 6,697,603 B1 * | 2/2004 | Lovinggood et al. | ...... | 455/13.1 |
| 2001/0043641 A1 * | 11/2001 | Harms et al. | ................ | 375/130 |
| 2001/0044681 A1 * | 11/2001 | Diana et al. | ................... | 701/19 |
| 2002/0028655 A1 * | 3/2002 | Rosener et al. | ............... | 455/16 |
| 2003/0032429 A1 * | 2/2003 | Macridis et al. | ............ | 455/435 |
| 2003/0114135 A1 * | 6/2003 | Lorbeck | ..................... | 455/403 |
| 2004/0157554 A1 * | 8/2004 | Wesel | ........................ | 455/12.1 |

* cited by examiner

*Primary Examiner*—Matthew Anderson
*Assistant Examiner*—Tan Trinh
(74) *Attorney, Agent, or Firm*—Carrier, Blackman & Associates, P.C.; Joseph P. Carrier; William D. Blackman

(57) ABSTRACT

A land mobile-satellite communication system comprises: at least one communication satellite station; a plurality of portable communication terminals for communicating with each other through a communication link to be formed to include the at least one communication satellite station; and a plurality of mobile repeater stations mounted on mobiles located on the earth for repeating the communication in the communication link formed between the portable communication terminals and including the at least one communication satellite station. Preferably, the system includes a plurality of communication satellite stations, each mounted on a respective one of a plurality of low earth communication satellites, and each including a mechanism for communicating each other through inter-satellite links.

25 Claims, 4 Drawing Sheets mobile repeater station communication satellite station

LAND MOBILE SATELLITE-COMMUNICATION SYSTEM

BACKGROUND OF THE INVENTION

1. Field of the Invention

This invention relates in general to a land mobile-satellite communication system and, in particular, to such a communication system which utilizes vehicles such as automobiles as carriers for newly introduced mobile repeater stations.

2. Discussion of Relevant Art

Recently, several land mobile-satellite communication systems have been planned in which portable telephone terminals can communicate with each other through communication satellite stations mounted on each of a plurality of low earth satellites. In such land mobile-satellite communication systems, if both calling and called portable telephone terminals locate in the same service area provided by one communication satellite station, a communication link or speech path between both the calling and the called telephone terminals can be formed through the communication satellite station.

On the other hand, if the called telephone terminal is not located in the service area provided for the calling telephone terminal, a communication link between the calling and the called portable telephone terminals will be made through an inter-satellites communication link.

In the communication systems described above, the radio transmission paths formed between the portable telephone terminals and the low earth communication satellite stations are much shorter than that which may be formed between the portable telephone terminals and stationary satellite stations of high altitude above the equator. As a result, it is possible to form communication links of high quality between the portable telephone terminals and the low earth communication satellite stations without imposing excess antenna gain or excess transmission power on either the communication satellites or the portable telephone terminals. Such land mobile-satellite communication systems are disclosed in U.S. Pat. Nos. 5,970,414; 6,072,768; 6,097,752; 6,108,561 etc.

However, to make such a communication system more economical, it will be necessary to reduce the size of the low earth communication satellite stations, including antennas, and to reduce power consumption in both the communication satellite stations and the portable telephone terminals.

Further, to make the communication more reliable and of higher quality, it will be necessary to improve SN ratio in the communication links between the portable telephone terminals and the low earth communication satellite stations.

Moreover, it is necessary to provide various services to the subscribers of such a land mobile-satellite communication system which includes an accessibility to the conventional land mobile communication systems and the conventional land networks such as Internet.

SUMMARY OF THE INVENTION

Accordingly, it is an object of the present invention to reduce the size of the low earth communication satellite stations including antennas.

It is another object of the present invention to reduce the power consumption in both the low earth communication satellite stations and the portable telephone terminals.

It is further another object of the present invention to improve the reliability and the quality of the communication in the land mobile-satellite communication system by increasing SN ratio of the communication link between the portable telephone terminals and the communication satellite stations.

It is still another object of the present invention to provide various services to the subscribers of such a land mobile-satellite communication system which includes accessibility to the conventional land mobile communication systems and land networks such as the Internet.

These and other objects of the present invention are achieved by the land mobile-satellite communication system of the present invention comprising: at least one communication satellite station, each said communication satellite station being mounted on a corresponding low earth satellite; a plurality of portable communication terminals for communicating with each other through a communication link formed to include said at least one communication satellite station; and a plurality of mobile repeater stations mounted on mobiles located on the earth for repeating a communication in said communication link between said portable communication terminals and including said at least one communication satellite.

According to a preferred embodiment of the present invention, said repeater stations include a means for communicating with said at least one communication satellite station by using carrier waves of higher frequency than that of carrier waves used for communicating with said portable communication terminals.

According to another preferable embodiment of the present invention, said portable communication terminals include a means for transmitting a position signal repeatedly, said position signal including an identification code of the portable communication terminals and a test pattern; said mobile repeater stations include a means for transmitting a repeated position signal to said at least one communication satellite station by adding a self identification code to said position signal received from said portable communication terminals; and said at least one communication satellite station includes a means for selecting one of said mobile repeater stations which transmits said repeated position signal including the test pattern having a highest quality as a mobile repeater station for the portable communication terminals.

According to another embodiment of the present invention, said at least one communication satellite station includes a means for working as Peering point or Proxies to provide accessibility to the conventional land mobile telephone system or Internet.

According to another preferred embodiment of the present invention, each said low earth communication satellite station includes a means for renewing cache by inter satellites communication.

DETAILED DESCRIPTION OF THE PREFERRED EMBODIMENT

Figure 1:
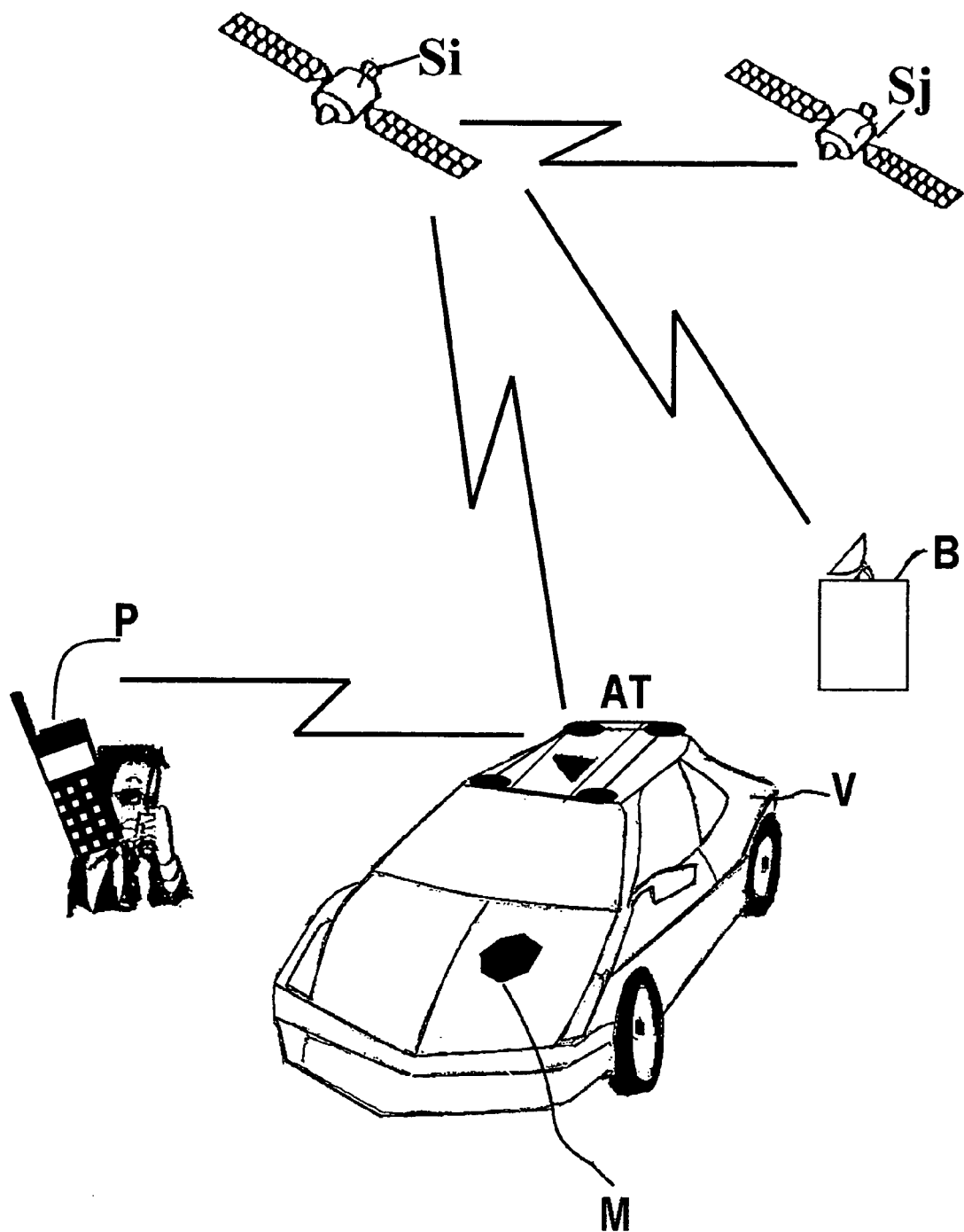
FIG. 1 is a schematic view showing a part of the land mobile-satellite communication system according to an embodiment of the present invention.

FIG. 1 is a schematic view of a part of the land mobile-satellite communication system according to an embodiment of the present invention. The system includes a plurality of communication satellite stations each mounted on each respective one of a plurality of low earth communication satellites . . . Si, Sj . . . Additionally the system includes a plurality of mobile repeater stations M, a plurality of base stations B and a plurality of portable communication terminals P although only one of each of these components is shown, respectively, in FIG. 1.

The portable communication terminals P may be carried by persons such as pedestrians who communicate each other through communication links which will be formed between the portable communication terminals P to include one or more low earth communication satellite(s) . . . Si, Sj . . . located thereabove. The mobile repeater station M is mounted on the mobile such as automobile V and has antenna AT to communicate with both the satellites . . . Si, Sj . . . above and the portable communication terminals P.

Figure 2:
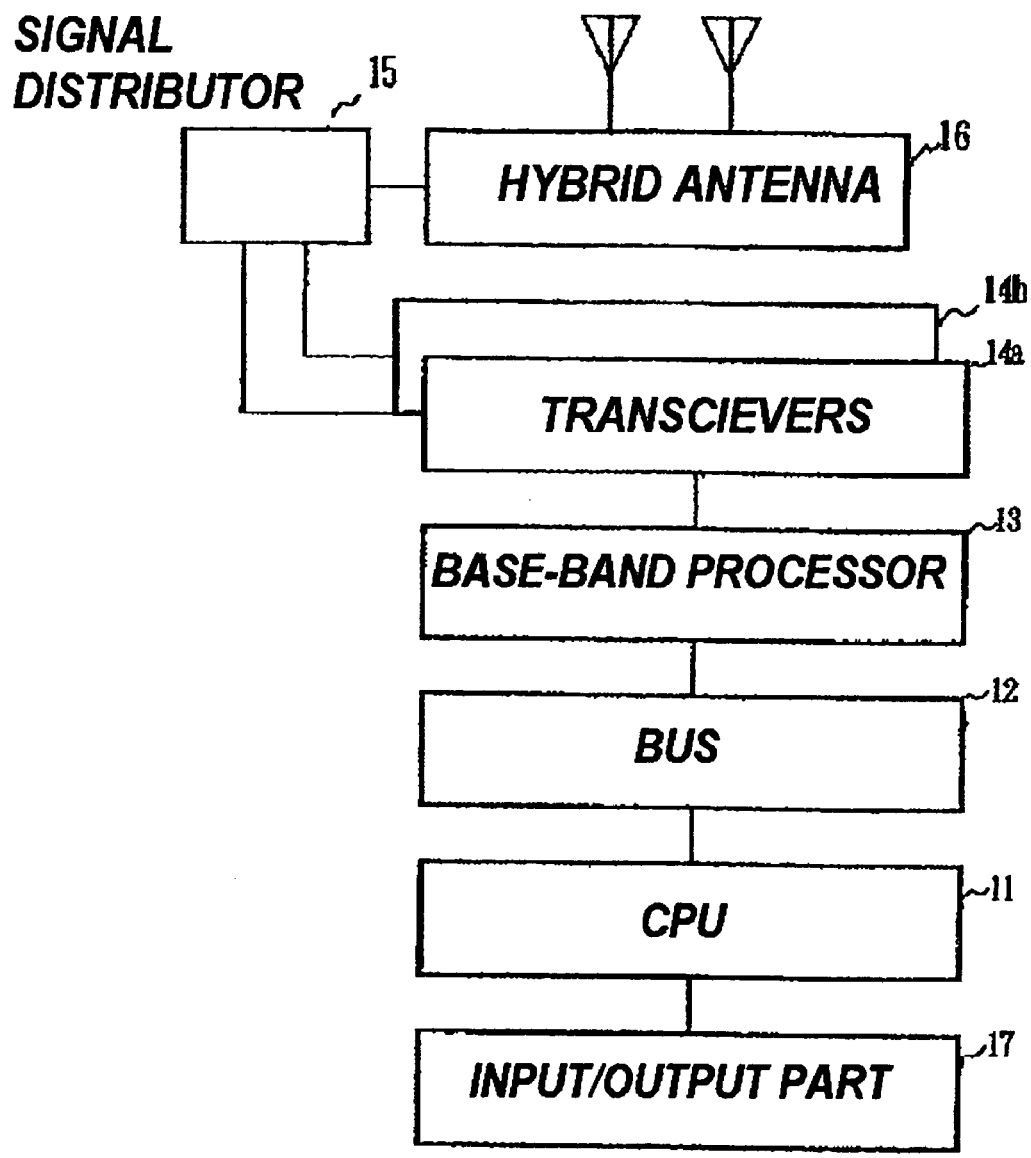
FIG. 2 is a block diagram showing an example of a structure of the portable communication terminal P included in the land mobile-satellite communication system shown in FIG. 1.

FIG. 2 is a block diagram showing an example of a construction of the portable communication terminal P. The portable communication terminal P includes a CPU 11, a bus 12, a base band processor 13 for processing base band signals, two transceivers 14a, 14b, a signal distributor 15, a hybrid antenna 16 and an input/output part 17. One of the transceivers 14a, 14b is used to communicate with the communication satellite stations through the mobile repeater stations M. The other of the transceivers 14a, 14b is used to communicate with conventional mobile communication systems such as PHP (Personal Handy Phone), etc.

The selection of the transceivers 14a, 14b is made automatically according to a function selected by a subscriber carrying this portable communication terminal P. The selection of the hybrid antenna 16 corresponding to the selected one of the transceivers 14a, 14b will be also made automatically at the same time as the selection of the transceivers is made.

Figure 3:
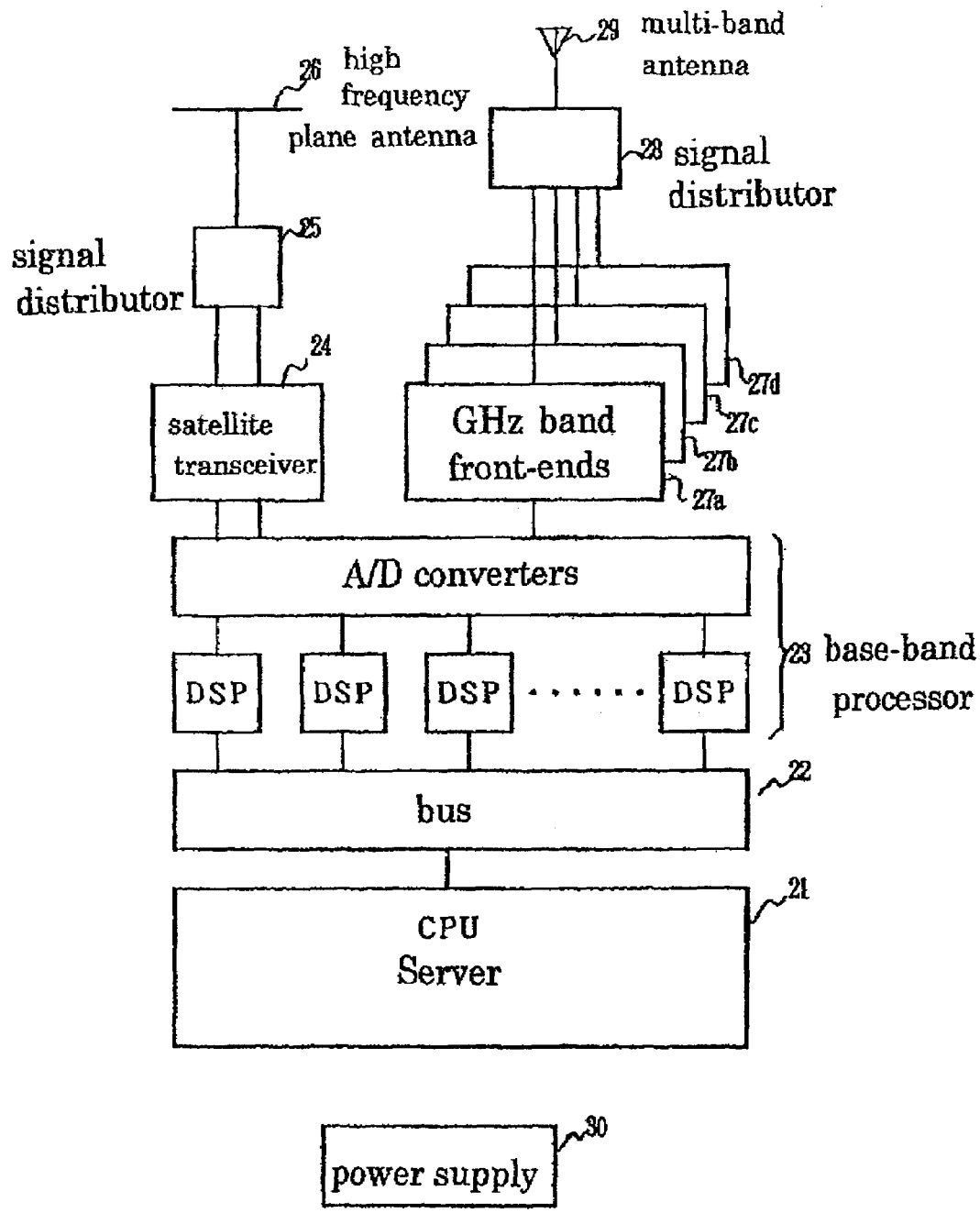
FIG. 3 is a block diagram showing an example of a structure of the mobile repeater station M included in the land mobile-satellite communication system shown in FIG. 1.

FIG. 3 is a block diagram showing an example of a structure of the mobile repeater station M. The mobile repeater station M includes a CPU 21 which can also work as a Server, a bus 22, a base-band processor 23, satellite transceivers 24, a signal distributor 25, a high frequency plane antenna 26, GHz band front-ends 27a–27d including a frequency converter, a signal distributor 28, a multi-band antenna 29 and a composite power supply 30. The base band processor 23 includes a plurality of A/D converters and digital signal processors (DSP) which operate at the same time.

The high frequency plane antenna 26 is fixed on the roof of the vehicle such as an automobile as a part of the antenna AT shown in FIG. 1 to be used for transmitting and receiving signals with the low earth communication satellites . . . Si, Sj . . . above. The multi-band antenna 28 is embodied, for example by a wide frequency band antenna such as a fractal antenna to allow the mobile repeater station M to communicate with various conventional communication systems such as a land mobile system.

The communication with the low earth communication satellite stations is performed by using high frequency band such as Ku band which has been planed to be used for transmitting control signals between the base station B and the low earth communication satellites . . . Si, Sj . . . On the other hand, the communication with the portable communication terminals P is performed by using S or a near to S frequency band ranging from 1 GHz–10 GHz.

Figure 4:
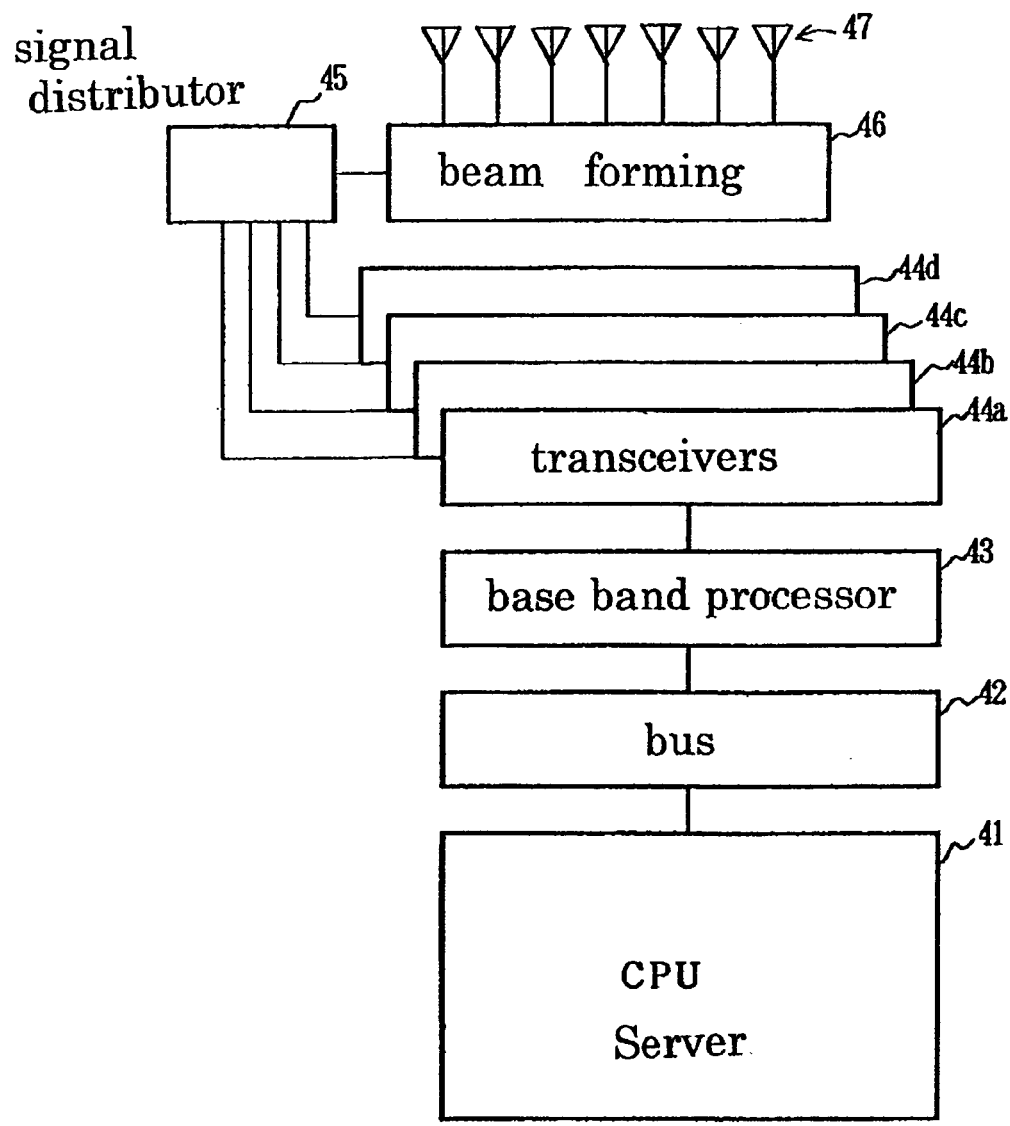
FIG. 4 is a block diagram showing an example of a structure of the communication satellite station mounted on the low earth communication satellite . . . Si, Sj . . . included in the land mobile-satellite communication system shown in FIG. 1.

FIG. 4 is a block diagram showing an example of a structure of the communication satellite station mounted on the low earth communication satellites . . . Si, Sj . . . The communication satellite station includes a CPU 41 which can also work as a Server, a bus 42, a base band processor 43 for processing base band signals, transceivers 44a–44d, a signal distributor 45, a beam forming part 46 and transmitting and receiving antenna elements 47. The beam forming part 46 controls phases of the transmitted and received signals for each of the transmitting and receiving antenna elements 47 to make them form spot beams. The number of the spot beams ranges from a few tens to more than one hundred and each of the spot beams is scanned or switched, respectively, under a control of the beam forming part 46.

As has been described above, according to the present embodiment, a high frequency band such as Ku band is allocated to the service links between the low earth communication satellite stations and the mobile repeater stations. Such a high frequency band has been conventionally planed to be allocated to the feeder links to transmit control signals between low earth communication satellite stations and the base stations B.

As a result, in the embodiment of the present invention, the frequency band to be allocated to the service links becomes wider casing an increase of the capacity for the data transfer in the service links. At the same time, the reduction of the size of the antenna elements mounted on the satellite caused by the use of the higher frequency band for service links make it possible to reduce the size of the communication satellites and, hence, makes it possible for such a communication system to be constructed and maintained with less cost.

The allocation of the higher frequency band for service links, of course, causes a problem that transmission loss in the service links will increase. However this problem can be solved easily by introducing the mobile repeater stations to be located between the low earth communication satellite stations and the portable communication terminals P according to the present invention.

The newly introduced mobile repeater stations make it possible to compensate the increment of the transmission loss in the service links by increasing antenna gain and transmitting power of the mobile repeater stations. Since the mobile repeater stations are mounted on the vehicle from which a sufficient amount of electric power can be easily supplied, it is possible to increase transmitting power in the up service links or to use low noise receiver in the down service links, which will consume a lot of power.

The composite power supply 30 in the mobile repeater station M includes various types of power generators for generating and storing electric power, such as a generator which will be driven by a gasoline engine, or a fuel cell, or solar batteries to assure enough power supply to the mobile repeater station M.

The portable communication terminal P may be carried by a subscriber such as a pedestrian or a car driver. In the CPU 11 of the portable communication terminal P, a position signal including the self identification code of the portable communication terminal P and a predetermined test pattern is read out from the data file inside the CPU 11 repeatedly. The read out of the position signal can be made periodically or almost periodically in response to a trigger signal from a timer inside or to some command from outside. The read out position signal is transferred through the bus 12, the base band processor 13, the transceiver 14a and the signal distributor 15 to be transmitted from the hybrid antenna 16.

The position signal transmitted from the portable communication terminal P may be received by the mobile repeater station M located nearby. In the mobile repeater station M, the received position signal may be transferred from the multi-band antenna 29 to the CPU 21, through the transceiver 27a, the base band processor 23 and the bus 22. The CPU 21 checks if the identification code of the portable communication terminal included in the received position signal has been already stored in the data file.

If it has not yet been stored in the data file, the CPU 21 stores the identification code included in the newly received position signal after adding to it the current time. If the position signal including the identification code has been stored already in the data file, the CPU 21 just renews the time to be added to it.

Further the CPU 21 makes a repeated position signal by adding the identification code and the position of the mobile repeater station itself to the received position signal. The position of the mobile repeater station can be detected by using various conventional methods, for example using a GPS receiver. The CPU 21 transfers the repeated position signal to the high frequency plane antenna 26 through the bus 22, the base band processor 23, the satellite transceiver 24 and the signal distributor 25 to be transmitted from the antenna 26 toward low earth communication satellite station (s) above.

The repeated position signal transmitted from the mobile repeater station M will be received by the communication satellite station mounted on the low earth communication satellite Si located above the mobile repeater station M. In the satellite communication station, the CPU 41 will receive the repeated position signal through the antenna 47, the beam forming part 46, the signal distributor 45, the transceiver 44a, to base band processor 43 and the bus 42. The CPU 41 makes a registered repeated position signal by adding a current time to the received repeated position signal and stores it in the data file.

The CPU 41 may receive a plurality of repeated position signals including the same identification code of the same portable communication terminal P. In this case, the CPU 41 detects an error rate of the digits included in the test pattern for each repeated position signal. The CPU 41 compares the digit error rates detected from each of the registered repeated position signals and gives priority to each of them according to the lowness of the detected digit error rates e.g. the highness of the quality of communication for the repeated position signals. The CPU 41 thus may store a plurality of registered repeated position signals of the same portable communication terminal P which have been received from different mobile repeater stations and have different priority.

A subscriber of the land mobile-satellite communication system can call another subscriber's portable communication terminal by putting a calling number into the subscriber's own portable communication terminal. The calling number for example can be the identification code of the portable communication terminal to be called, which will be set by inputting it from input/output part 17 of the calling communication terminal. In the CPU 11 of the calling terminal, a calling signal is made to include identification codes of both calling and called portable communication terminals and the predetermined test pattern. The calling signal is transferred through the bus 12, the base band processor 13, the transceiver 14 and the signal distributor 15 to the hybrid antenna 16 to be transmitted.

The calling signal will be received by the mobile repeater station M located in the vicinity of the calling portable communication terminal P. In the mobile repeater station M, the received calling signal will be transferred to the CPU 21 through the multi-band antenna 29, the transceiver 27a, the base band processor 23 and the bus 22. The CPU 21 tries to detect if the position signal has been stored in the data file includes the same identification code as that of the called portable communication terminal. If such a position signal has been stored in the data file, the CPU 21 transmits a calling signal for calling the called portable communication terminal.

If the CPU 21 receives a response from the called portable communication terminal, the CPU 21 forms the communication channel between both calling and called portable communication terminals through the mobile repeater station M. Thus the communication channel will be formed to be folded back inside the mobile repeater station M to successively connect the calling portable communication terminal—the mobile repeater station—the called portable communication terminal.

On the other hand, if the position signal including the identification code of the called portable communication terminal has not been stored in the data file, the CPU 21 makes a repeated calling signal for calling the called portable communication terminal by adding the identification code and the position of the mobile repeater station M. The CPU 21 then transfers the repeated calling signal to the plane antenna 26 through the bus 22, the base band processor 23, the satellite transceiver 24 and the signal distributor 25 to be transmitted toward the low earth satellite above.

The repeated calling signal transmitted from the mobile repeater station M will be received by a low earth communication satellite located above the mobile repeater station. In the communication satellite station, the received repeated calling signal will be transferred from the antenna 47 to the CPU 41 through the beam forming part 46, the signal distributor 45, the transceiver 44a, the base band processor 43 and the bus 42. The CPU 41 tries to detect if the registered repeated position signal has been stored in the data file including the same identification code as that of the called portable communication terminal included in the received repeated calling signal.

If such a registered repeated position signal has been stored in the data file, the CPU 41 transmits a calling signal to the mobile repeater station having an identification code included in the registered repeated position signal for calling the called portable communication terminal. A plurality of the registered repeated position signals including the same identification code of the called portable communication terminal may be stored in the data file, as described above.

In this case, the CPU 41 selects one registered repeated position signal of the highest priority (of the highest communication quality) and transmits the calling signal to the mobile repeater station having the identification code included in the selected registered repeated position signal. Thus a call for the called portable communication terminal will be made through the selected mobile repeater station thereby providing highest quality communication between the portable communication terminals.

The calling signal transmitted from the low earth communication satellite station will be received by the selected mobile repeater station. In the selected mobile repeater station, the CPU 21 checks if the position signal including the identification code of the called portable communication terminal has been stored in the data file. If it has been stored in the data file, the CPU 21 transmits the repeated calling signal for calling the called portable communication terminal.

If the CPU 21 receives a response signal from the called portable communication terminal, the CPU 21 forms a communication channel with the called portable communication terminal. Thus, the communication channel is formed to connect the calling portable communication terminal—the first mobile repeater station—the low earth communication satellite station—the second mobile repeater station—the called portable communication terminal, successively.

On the other hand, if the registered repeated position signal of the called portable communication terminal has not been stored in the data file of the communication satellite station, the CPU 41 in the communication satellite station makes an inter-satellite calling signal by adding the identification code of the communication satellite station to the received repeated calling signal and transmits it to other satellite(s) near by. Any other satellite which receives the inter-satellite calling signal checks its data file to determine if the registered repeated position signal including the identification code of the called portable terminal is stored therein.

If it is stored in the data file, the CPU 41 in such other, or, second, satellite makes a calling signal for calling the called portable communication terminal through a corresponding mobile repeater station. If the second satellite receives a response from the called portable communication terminal through the corresponding mobile repeater station, a communication channel will be made between calling and called portable communication terminals through inter-satellite communication link.

On the other hand, if the registered repeated position signal including the identification code of the called portable communication terminal has not been stored in the data file in the second satellite station which has received the inter-satellite calling signal, the second satellite makes another inter-satellite calling signal for calling the called portable communication terminal by adding the identification code of the second communication satellite station and transmits it to other communication satellite(s) nearby.

The above said inter-satellite transmission of the calling signal will be repeated until it reaches a communication satellite station storing the registered repeated position signal of the called portable communication terminal in its data file. As a result, a communication channel or speech path will be made between the calling and the called portable communication terminals through a plurality of inter-satellite links.

In addition to the means for communicating with the other portable communication terminals P through the mobile repeater stations M and the low earth communication satellite stations as described above, the portable terminal P further includes additional means for communicating with other communication systems including fixed radio base stations and public telephone systems, such as PHS. As is shown in the block diagram of FIG. 2, the portable communication terminal P includes the transceiver 14b in addition to the transceiver 14a and communicates with conventional communication systems through the signal distributor 15 and hybrid antenna 16.

As is shown in FIG. 3, the mobile repeater station M includes various types of transceivers (Ghz frequency band front-ends) 27b, 27c, 27d, each of which transmits and receives carriers of different frequencies, and the base band processor 23, in addition to the transceiver 27a so as to function as repeaters between various communication terminals in other similar communication systems and the other types of communication satellites.

The base band processor 23 includes the A/D converters and the plurality of DSPs (Digital Signal Processors) which operate simultaneously in parallel. Various types of signals of different frequency, modulation method or data format are output from the transceivers 27b–27d and are converted fast by the DSPs into common signals of the same frequency, the same modulation method and the same data format to be processed by the CPU 21.

Inversely, the common signals output from the CPU 21 are converted fast into the various different types of signals and transferred through the transceiver 27b-27d to be transmitted from the multi-band antenna 29 toward the various communication terminals excluding the portable communication terminals P described above. Programs or softwares which run in the DSP for processing the signals are replaced according to the signals to be processed. Further, the programs for processing the signals can be replaced by a method of down load if it is necessary.

The high frequency plane antenna 26 is mounted on the roof of the vehicle V and is implemented by an array antenna composed of a plurality of plane antenna elements. The plane antenna can tilt in a direction of a beam transmitted from it from a direction of it's normal line in two dimensional directions by controlling the phase of signals to be supplied to each of the antenna elements in an appropriate manner. The angle of tilt of beam measured from the nominal line of the plane antenna is called a tilt angle of the plane antenna.

Further, the low earth communication satellites include a means for detecting their positions from the information about their orbits and current time and a means for informing their detected positions to the mobile repeater stations through down links. The mobile stations include a means for tracking the low earth communication satellites by controlling the tilt angles of their plane antennas in response to the positions of the low earth communication satellites and their positions detected by using the GPS receivers, etc.

The low earth communication satellite stations preferably include a means for scanning their antenna beams to the mobile repeater stations by controlling the beam forming part 46 in response to their own positions and the mobile repeater stations included in the received repeated position signals.

As described above, in the case in which there are a plurality of the mobile repeater stations around the portable communication terminal, a plurality of the communication channels can be formed between the portable communication terminal and the communication satellite above through different mobile repeater stations near by. In this case, only one communication channel of the highest communication quality (of the lowest digit error rate of the test pattern in the registered repeated position signal) is selected as a present communication channel or link and the other communication channels or links are reserved as spares, as described above. In other words, the mobile repeater stations are not dedicated for use in association with any given one(s) of the portable communication terminals, but are selectively associated for use based on proximity and signal quality.

If the order of the quality of communication channels changes between the present and the spare communication channels, the communication channel itself will be switched between both the present and the spare communication channels to result in the replacement of the mobile repeater stations between the portable repeater stations and low earth communication satellite stations.

If the switching of the communication channels described above is made frequently, an efficiency of the communication will be lowered. To avoid such an undesirable situation, a tracking between the low earth communication satellites and the mobile repeater stations will be performed by scanning their antenna beams so as to keep the quality of the communication of the present communication channel maximum. The tracking performed by scanning antenna beams is an effective way to keep efficiency of communication to be high value, especially when a large amount of data is being transferred between the mobile repeater stations and the low earth communication satellite stations.

The land mobile—satellite communication system of the present embodiment is constructed to allow transmission and reception of massive data with other land net-work data communication systems, such as Internet. When each of the low earth communication satellite stations reaches above each of the base stations B which also work as nodes for transmitting and receiving data with the other or conventional land network systems, the communication satellite station transmits a request to the base station B for sending data stored in the other net-works, for example the Servers in the Internet, to the low earth communication satellite station.

The base station B which has received the request from the communication satellite station transmits the data requested. In the satellite station which receives the data sent from the base station B, the received data will be stored in the data file in the CPU 41 which also works as a server in the land mobile-satellite communication system of the present embodiment. In this way, the communication satellite stations also include the Server and Peering point function for transmitting and receiving data between different net-works such as Internet.

When the communication satellite station receives a request for transmitting data from the portable communication terminals P through the mobile repeater stations M, the CPU 41 in the communication satellite station checks if the requested data has been stored in the data file. If the data has been stored in the data file, the CPU 41 reads out the data from the data file and transmits it to the portable communication terminals P which has sent the request through the mobile repeater stations M. If the requested data has not been stored in the data file, the CPU 41 transmits a request to other communication satellite(s) through inter-satellite links for sending the data to it.

When the communication satellite station receives the requested data transmitted from another communication satellite station, the data will be stored in the data file in the CPU 41. The CPU 41 then transmits the data under request to the mobile repeater station M which has repeated or relayed the request for the data from the portable communication terminals P.

The mobile repeater station M which received the data will store it in the data file and will transmit it to the portable communication terminal which issued the request. Thus, the data requested by any one of the portable communication terminals P will be stored in the data file in the mobile repeater station M which transferred the data in response to the request. When a new request for sending the newly stored same data is issued by another portable communication terminal P, the newly stored data will be read out from the data file in the mobile repeater station M and will be transmitted to the other portable communication station P.

Thus, the mobile repeater station M include a functions of Cashing, Proxy and Server for storing transferred data inside the mobile repeater station as a cache and for transmitting the cache to other portable communication terminals which issue requests for the same data.

The mobile repeater station M transmits a request for sending new data requested from the portable communication terminal P, if it is not stored in the data memory. Preferably, the newest data stored in the other land net-work system such as Internet will be transmitted through the base station B to one of the low earth communication satellite stations. The newest data will be also transmitted to other communication satellite stations through inter-satellites links. Thus, the renewal of the stored data or cache in the low earth communication satellite stations will be made almost at the same time.

The mobile repeater stations M and the communication satellite stations also work as a Mail Server for storing e-mails transmitted from the portable communication terminals P in the data files of the mobile repeater stations M or the communication satellite stations and for mailing them in response to a request from the portable communication terminal which is the destination of the e-mail.

The mobile repeater stations and the communication satellite stations also have functions to work as a Provider including mailing, Web, FTP, and Proxy functions for sending various data, for example, requested pages of requested news papers. The mobile repeater stations M also include a Peering function for connecting the mobile repeater stations M mutually for obtaining various information, for example, information about a traffic accident reported from another mobile repeater station, through the communication satellite stations.

Each of the communication satellite stations includes a means for increasing the beam width in response to a request made by the portable communication terminals P or the mobile repeater stations M. The increase of the beam width can be accompanied by an increase of the transmission power to compensate a decrement of the spatial power density caused by the increment of the beam width. Because of the function for increasing the beam width, a subscriber carrying the portable communication terminals P can report some special traffic information he has found, for example appearance of an obstacle caused by a natural disaster such as a landslide to the other portable communication terminals P dispersing nearby through the mobile repeater stations M and the communication satellite station.

The mobile repeater stations M include a means for collecting and storing or transmitting to the satellite stations information about traffic or environment of the surrounding region for example, images taken by camera mounted on the vehicle, the climate data such as temperature or humidity, a situation of a traffic jam which may be measured, for example by a mean cruising velocity of the vehicle itself. This information is stored in the data files inside the communication satellite stations. The subscribers of the land mobile-satellite communication system of the present embodiment carrying the portable communication terminals P can obtain the information about traffic and environment in the various remote regions obtained by the mobile repeater stations M locating in each regions.

The mobile repeater station M and the accompanying antenna can be mounted on a car which belongs to or is leased by a person who contracted with a manager of the land mobile-satellite communication system of the present invention. As a mobile for carrying the mobile repeater stations, ships such as motor boats can be used instead of vehicles.

Although the invention has been described above with reference to only a limited number of presently preferred embodiments, the embodiments are not intended to limit the scope of the invention. Many modifications and variations are possible within the scope of the invention, as indicated appended claims.

All such modifications and variations that may be apparent to an ordinary person skilled in the art are intended to be within the scope of this invention.

What is claimed is:

1. A land mobile satellite communication system comprising:
    at least one communication satellite station;
    a plurality of portable communication terminals for communicating with each other through a communication link to be formed to include said at least one communication satellite station; and
    a plurality of mobile repeater stations mounted on mobiles located on the earth for repeating a communication in said communication link formed between said portable communication terminals and including said at least one communication satellite station, wherein:
    each said mobile repeater station is operable with any of said portable communication terminals;
    each said mobile repeater station includes a means for communicating with said at least one communication satellite station by using a carrier wave of higher frequency than a frequency of a carrier wave to be used for communicating with said portable communication terminals; and
    a communication link between any specific one of the communication terminals and any specific one of said at least one communication satellite station can be established via a plurality of communication channels respectively including different ones of the mobile repeater stations.

2. The land mobile satellite communication system as claimed in claim 1, including a plurality of said communication satellite stations respectively mounted on a plurality of low earth communication satellites and each said station including a means for communicating with other said stations through inter-satellite links.

3. The land mobile satellite communication system as claimed in claim 2, wherein:
    said portable communication terminals include a means for communicating with said mobile repeater stations as well as with conventional land mobile communication systems.

4. The land mobile satellite communication system as claimed in claim 2, wherein:
    said mobile repeater stations include a means for converting at least one of frequency and modulation for communication by changing software to allow communication with conventional land mobile communication systems.

5. The land mobile satellite communication system as claimed in claim 2, wherein:
    said communication satellite stations include a means for transmitting information about their own position; and
    said mobile repeater stations include means for aiming an antenna beam thereof at the communication satellites according to received information about the position of the communication satellites and a detected position of the mobile repeater stations.

6. The land mobile satellite communication system as claimed in claim 2, wherein:
    said communication satellite stations include a means for functioning as a Peering points or Proxies to provide accessibility to conventional land mobile telephone systems or Internet.

7. The land mobile satellite communication system as claimed in claim 2, wherein:
    said communication satellite stations include a means for storing data received from said portable communication terminals and for functioning as servers.

8. The land mobile satellite communication system as claimed in claim 2, wherein:
    said mobile repeater stations include a means for responding to a request from said communication satellite stations and/or portable communication terminals and for functioning as providers.

9. The land mobile satellite communication system as claimed in claim 1, wherein:
    said communication satellite stations include a means for transmitting information about their own position; and
    said mobile repeater stations include means for aiming an antenna beam thereof at the communication satellites according to received information about the position of the communication satellites and a detected position of the mobile repeater stations.

10. The land mobile satellite communication system as claimed in claim 1, wherein: said mobiles are vehicles.

11. The land mobile satellite communication system as claimed in claim 10, wherein: power supplies of said vehicles provide power to said mobile repeater stations.

12. The land mobile satellite communication system as claimed in claim 1, wherein: said mobile repeater stations include high frequency plane antennas.

13. The land mobile satellite communication system as claimed in claim 1, wherein: communications between the portable communication terminals and the mobile repeater stations use S or near S frequency band ranging from 1–10 Ghz, and communications between the low earth communication satellite station and the mobile repeater stations use high frequency Ku band.

14. The land mobile satellite communication system as claimed in claim 1, wherein said mobile repeater stations include the functions of cache, proxy and server for storing transferred data.

15. The land mobile satellite communication system as claimed in claim 1, wherein the communication link having highest signal quality is selectively established via the one of the plurality of communication channels including said mobile repeater station with appropriate proximity to the specific communication terminal thereby providing highest quality communication between the portable communication terminals.

16. The land mobile satellite communication system as claimed in claim 1, wherein the communication link is selectively established via the one of the plurality of communication channels including said mobile repeater station giving highest signal quality.

17. The land mobile satellite communication system as claimed in claim 16, wherein all others of the plurality of communication channels are reserved as spares for establishing the communication link, and the communication link may be selectively switched to be established via one of the spares when the signal quality for the one of the spares comes to exceed the signal quality of the one communication channel.

18. The land mobile satellite communication system as claimed in claim 1, wherein said communication channels respectively include different ones of the mobile repeater stations which are located near the portable communication terminal.

19. The land mobile satellite communication system as claimed in claim 1, wherein: each of said mobile repeater stations and communication satellite stations additionally functions as a server for storing e-mails transmitted from one of the portable communication terminals and for mailing them to a portable communication terminal in response to a request therefrom.

20. The land mobile satellite communication system as claimed in claim 19, wherein the server further functions as a provider of at least one of internet, FTP and proxy server for sending a variety of data.

21. The land mobile satellite communication system as claimed in claim 1, wherein a subscriber carrying one of said portable communication terminals can report a disaster situation to the other portable communication terminals dispersing nearby through said mobile repeater stations and said communication satellite stations, and wherein each of the communication satellite stations includes a means for increasing beam width thereof thereby increasing transmission power.

22. The land mobile satellite communication system as claimed in claim 1, wherein each of said mobile repeater station further comprises a means for collecting, storing and transmitting information about traffic, accidents and climate data to the communication satellite stations; and wherein the portable communication terminals can obtain the information about the traffic, accidents and climatic data, and wherein a tracking between die communication satellite stations and mobile repeater stations is performed for effective communication.

23. The land mobile satellite communication system as claimed in claim 1, wherein each of said mobile repeater stations includes a composite power supply having power generators for generating and storing electric power, said power generators driven by at least one of a gasoline engine, fuel cell and solar batteries thereby assuring enough power supply to the mobile repeater station.

24. A land mobile-satellite communication system comprising:
- a plurality of communication satellite stations respectively mounted on a plurality of low earth communication satellites and each said station including a means for communicating with other said stations through inter-satellite links;
- a plurality of portable communication terminals for communicating with each other through a communication link to be formed to include said communication satellite stations; and
- a plurality of mobile repeater stations mounted on mobiles located on the earth for repeating a communication in said communication link formed between said portable communication terminals and including said communication satellite stations; wherein
- said portable communication terminals include a means for transmitting a position signal repeatedly, said position signal including an identification code of the portable communication terminals and a test pattern;
- said mobile repeater stations include a means for transmitting a repeated position signal to said communication satellite stations by adding a self identification code to said position signal received from said portable communication terminals; and
- said communication satellite stations include a means for selecting one of said mobile repeater stations which transmits said repeated position signal including the test pattern having a highest quality to be a mobile repeater station for the portable communication terminals.

25. A land mobile satellite communication system comprising:
- a plurality of communication satellite stations respectively mounted on a plurality of low earth communication satellites and each said station including a means for communicating with other said stations through inter-satellite links;
- a plurality of portable communication terminals for communicating with each other through a communication link to be formed to include said communication satellite stations; and
- a plurality of mobile repeater stations mounted on mobiles located on the earth for repeating a communication in said communication link formed between said portable communication terminals and including said communication satellite stations; wherein
- said mobile repeater stations include a means for communicating wit said communication satellite stations by using a carrier wave of higher frequency than a frequency of a carrier wave to be used for communicating with said portable communication terminals.

* * * * *